(12) United States Patent
Bianchi

(10) Patent No.: US 6,414,399 B1
(45) Date of Patent: Jul. 2, 2002

(54) MULTIFUNCTIONAL OPERATING UNIT FOR NAUTICAL USE

(76) Inventor: Gianfranco Bianchi, Via Corsica 21, Genoa (IT), 16128

( * ) Notice: Subject to any disclaimer, the term of this patent is extended or adjusted under 35 U.S.C. 154(b) by 0 days.

(21) Appl. No.: 09/524,096

(22) Filed: Mar. 14, 2000

(30) Foreign Application Priority Data

Jan. 28, 2000 (EP) .............................................. 00830054

(51) Int. Cl.⁷ .............................................. B63B 35/00
(52) U.S. Cl. ............................ 290/1 A; 290/1 B; 290/2
(58) Field of Search ................................. 290/1 R, 1 A, 290/1 B, 2, 43, 54; 62/86, 177, 323; 165/47

(56) References Cited

U.S. PATENT DOCUMENTS

| | | | |
|---|---|---|---|
| 2,228,446 A | 1/1941 | Drapeau | 123/178 |
| 3,720,842 A | 3/1973 | Martin et al. | 307/68 |
| 4,075,867 A | * 2/1978 | Seipp | 62/323 |
| 4,409,961 A | * 10/1983 | O'Hare | 126/433 |
| 4,600,049 A | 7/1986 | Nilsson et al. | 165/1 |
| 4,836,123 A | 6/1989 | Grinde et al. | 114/270 |
| 4,987,953 A | 1/1991 | Hedstrom | 165/47 |
| 5,249,429 A | 10/1993 | Hanson | 62/86 |
| 5,584,185 A | 12/1996 | Rumble et al. | 62/115 |
| 6,026,653 A | * 2/2000 | Presnell | 62/177 |
| 6,170,279 B1 | * 1/2001 | Li | 62/238.3 |

FOREIGN PATENT DOCUMENTS

| | | | |
|---|---|---|---|
| DE | 33 15 462 | 10/1984 | F24J/3/04 |
| DE | 3601 193 | 7/1987 | |
| GB | 819292 | 10/1956 | |
| WO | WO 99 04146 | 1/1999 | |

OTHER PUBLICATIONS

Allanson, J.T. et al.: Drinking seawater via reverse osmosis. Marine Engineer Review Mar. 1983, pp. 14–17.

* cited by examiner

Primary Examiner—Nicholas Ponomarenko
(74) Attorney, Agent, or Firm—Darby & Darby

(57) ABSTRACT

A multifunctional operating unit which in the nautical field is used to produce electric power. Advantageously this unit is provided with one or more containers associated with an internal combustion engine, wherein sea water coming from outboard circulates. In this manner it is possible to achieve a compact unit wherein the engine actuates directly a desalination pump and/or the compressor of an aboard air conditioning system, whose condenser may be accommodated in the container.

17 Claims, 11 Drawing Sheets

MULTIFUNCTIONAL OPERATING UNIT FOR NAUTICAL USE

BACKGROUND OF THE INVENTION

1. Field of the Invention

The present invention relates to operating units which in the nautical field in general and in particular on pleasure boats, both sailing and motor boats, are used to produce electric power.

2. Description of Related Art

As is known, on boats of the type mentioned above, the electricity for uses on board is customarily generated by suitable operating units, consisting essentially of an internal combustion engine, usually a diesel engine, to which it is connected directly, or by way of known mechanical reduction systems, an electrical machine; the latter is in most cases an alternator, which therefore produces alternating current, but it may also be a dynamo which thus generates direct current.

For the sake of brevity reference will mainly be made to operating units with an alternator, but the considerations set forth shall however be understood to apply also to units provided with a dynamo.

The diesel engine of these units is normally cooled with sea water; to this end it is equipped with its own pump which circulates the water inside it and then provides to expel water from the same exhaust of the engine combustion gases.

The alternator, on the other hand, is generally air-cooled and for this purpose is provided with a ventilating fan which causes air from the external environment to lick the electrical windings.

However, there are water-cooled alternators which instead of forced ventilation means have a pump for the circulation of cooling water.

It is easy to understand that the operating units designed in this manner serve only to perform the function of generating electric power for use on board; it should however be borne in mind that although they are produced in a fairly simple and compact form, for their installation it is nevertheless necessary to provide conditions and infrastructure works (spaces, sea intakes and pipes for the cooling water, exhausts for the fumes, and so on) essential for their operation.

Indeed, it should not be forgotten that the units in question require periodic maintenance, and need to be arranged in such a manner as to limit the inconvenience caused by the noise of their internal combustion engine.

As can be seen, there are some important technical aspects which must necessarily be taken into account when installing on pleasure boats the units which generate electric power.

Thus, arises the need for increasing the functional potential of these operating units, in order to obtain the maximum benefit from the power which they produce and the on board resources (space, various infrastructure elements, etc.) Necessary for their utilization and operation.

In this context it just matters to be reminded that on the boats every element must be designed in order to obtain the best possible result, with weights and overall dimensions reduced to the essential minimum: nor are the units which generate electric power therefore an exception to this principle.

SUMMARY OF INVENTION

It is therefore an object of the present invention to fulfill this need. Such an object is fulfilled by an operating unit comprising an internal combustion engine coupled to a machine for producing electric power (an alternator if it is alternating current, or a dynamo if it is direct current), in which there is at least one container wherein sea water from outside the boat is made to circulate.

This container has numerous advantageous effects including: preventing any possible damage to the diesel engine in the case of blocking up of the sea intake for the cooling water, being used as a heat exchanger for cooling the condenser of an air conditioning system, supplying water to the pump of a desalination apparatus, and other purposes, which facilitate the optimum utilization of the energy produced by the operating unit itself and provide for a more rational use of the space occupied as a whole by the various items of in board equipment, which operate with said energy.

The characterizing features of the invention are set out in the claims appended to this description.

BRIEF DESCRIPTION OF THE DRAWINGS

The features and the advantages deriving therefrom will become clearer from the explanation of non-exclusive exemplary embodiments of the present invention, provided below with reference to the appended drawings, wherein.

DETAILED DESCRIPTION OF THE INVENTION

In the figures, an operating unit according to the invention is indicated as 1.

Figure 1:
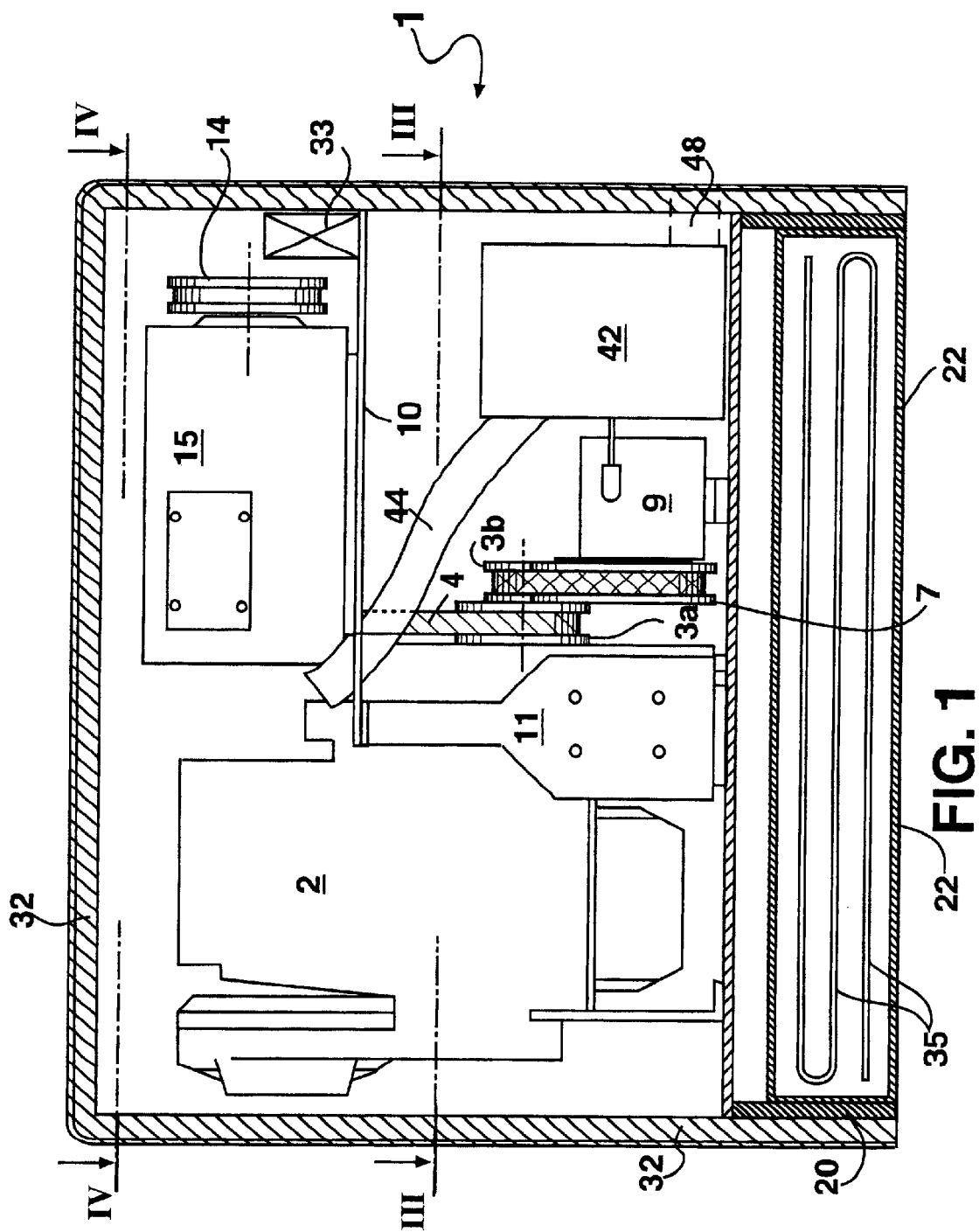
FIG. 1 shows a side view, partially in section, of a first embodiment of an operating unit in accordance with the present invention.

It comprises an internal combustion engine 2, preferably a diesel engine, on the output shaft thereof it is arranged a pulley 3 with two races 3a, 3b of different diameters; said races are respectively connected by way of corresponding belts 4 and 5 to two pulleys 6 and 7, the first of which drives an electric motor 8 and the second a pump 9. The latter is the high pressure pump of a reverse osmosis apparatus for the desalination of sea water, of a type which is already known per se; its delivery side is therefore connected to the customary osmotic membranes (not shown in the drawings) which serve to desalinate the water for uses on board; as can be seen from the drawings (cf. FIG. 1), the pump 9 is substantially at the same level as the pulley 3 of the engine 2.

The electric motor 8, however, is at a higher level with respect to the pump 9, being mounted on a bracket 10 supported by vertical arms 11 which extend upwards in the unit 1.

Figure 2:
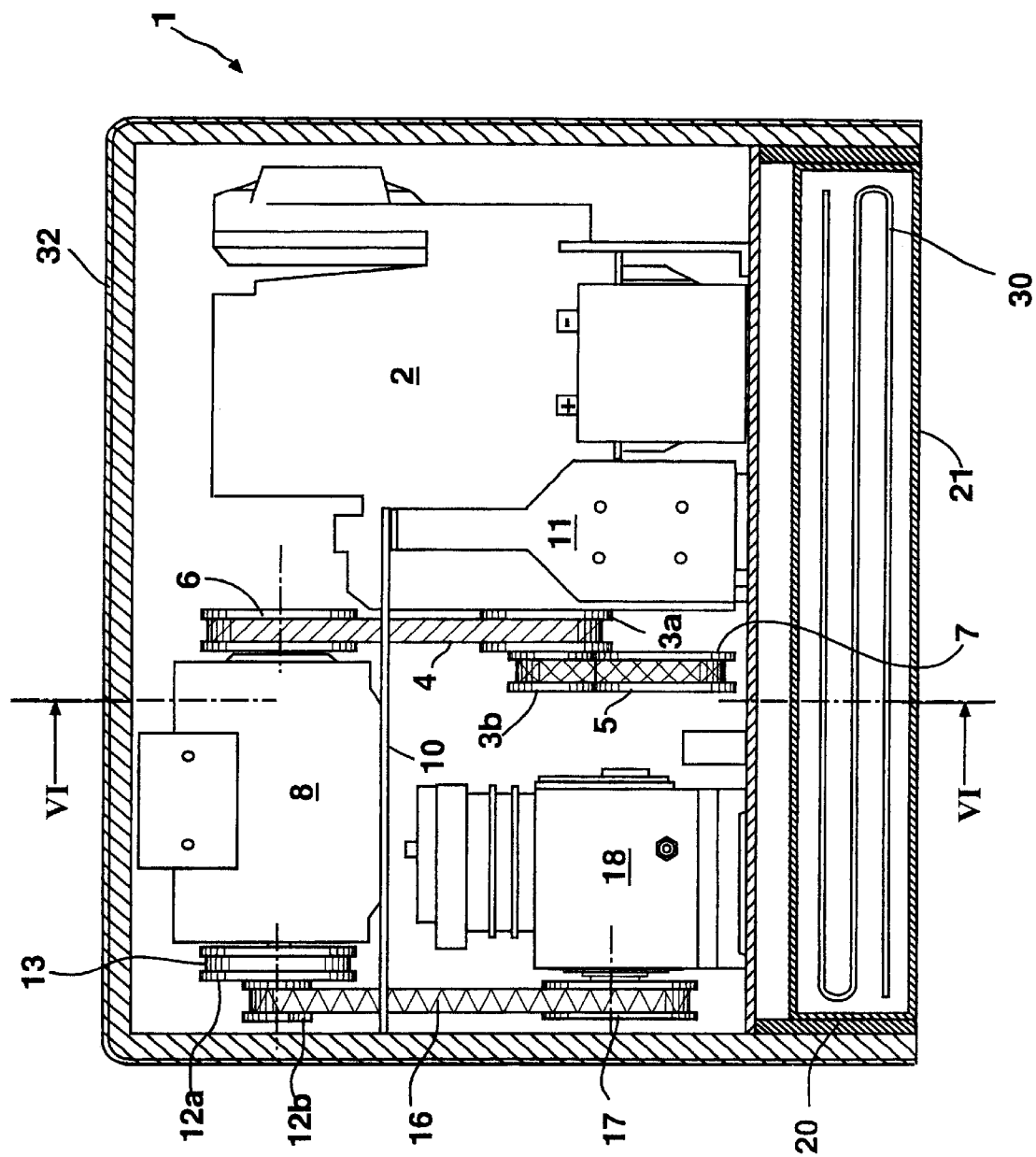
FIG. 2 shows a view of the same operating unit above from the opposite side to that in FIG. 1.
Figure 3:
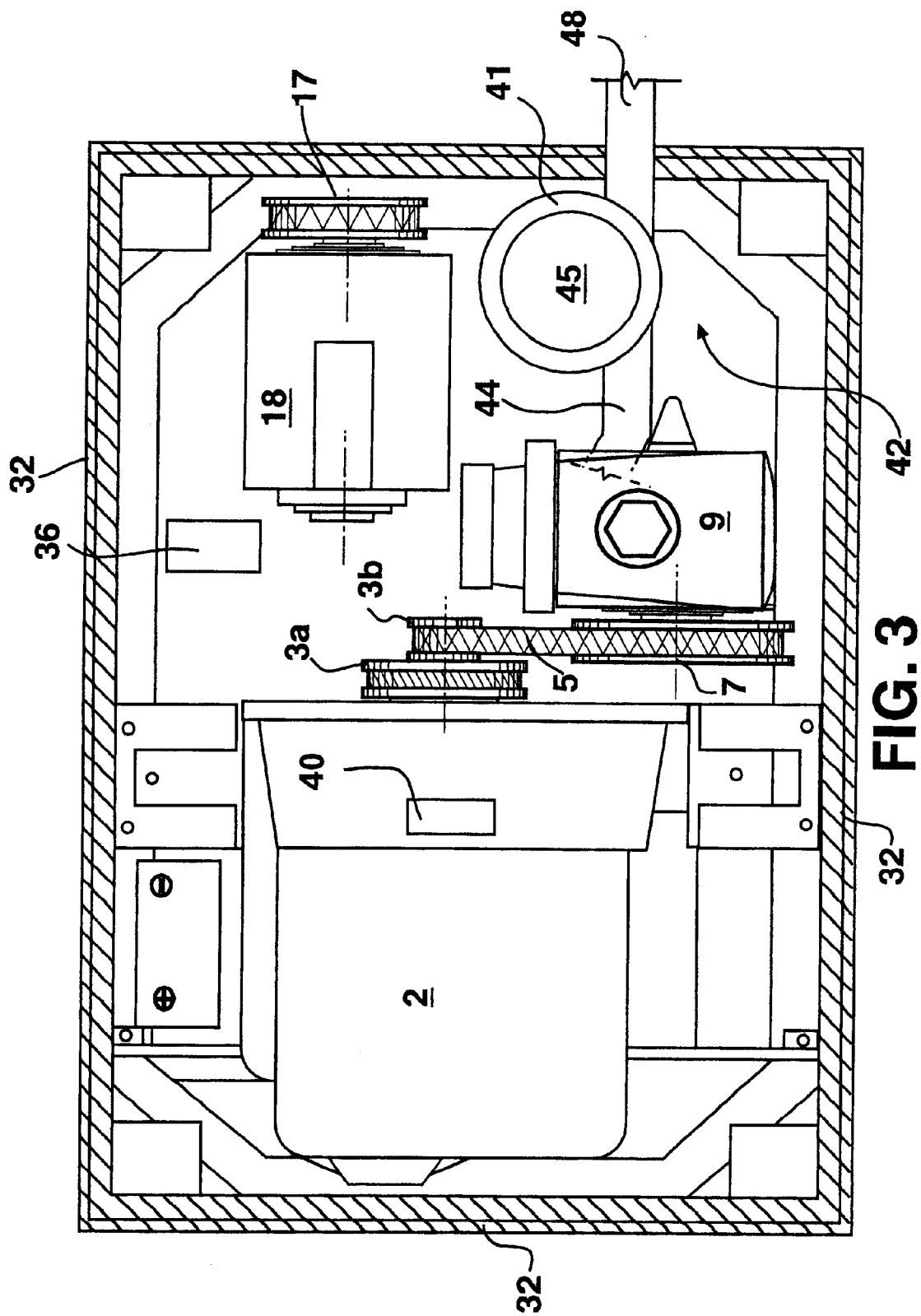
FIG. 3 is a view in section along the line III—III of FIG. 1.
Figure 4:
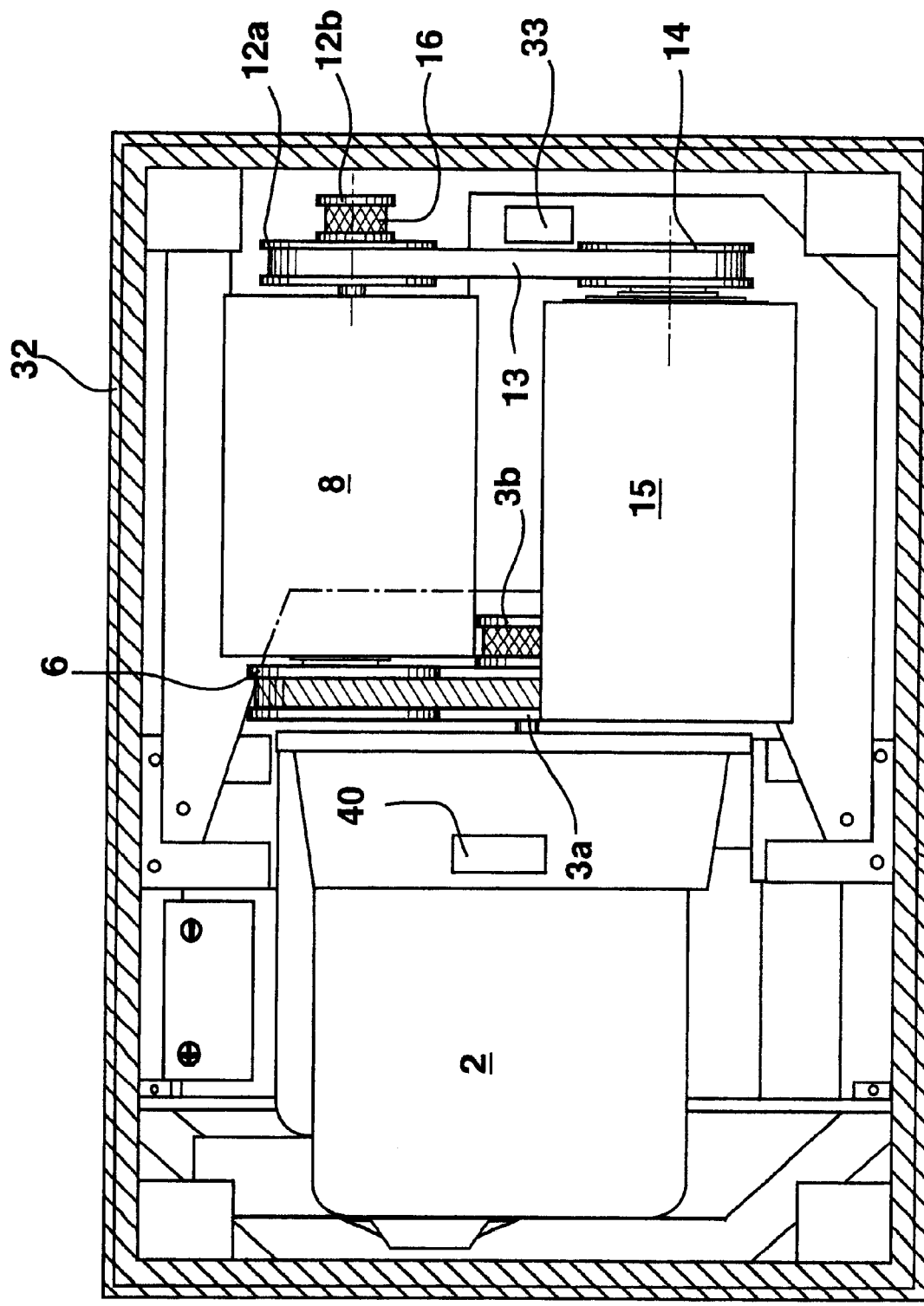
FIG. 4 is a view in section along the line IV—IV of FIG. 1.
Figure 5:
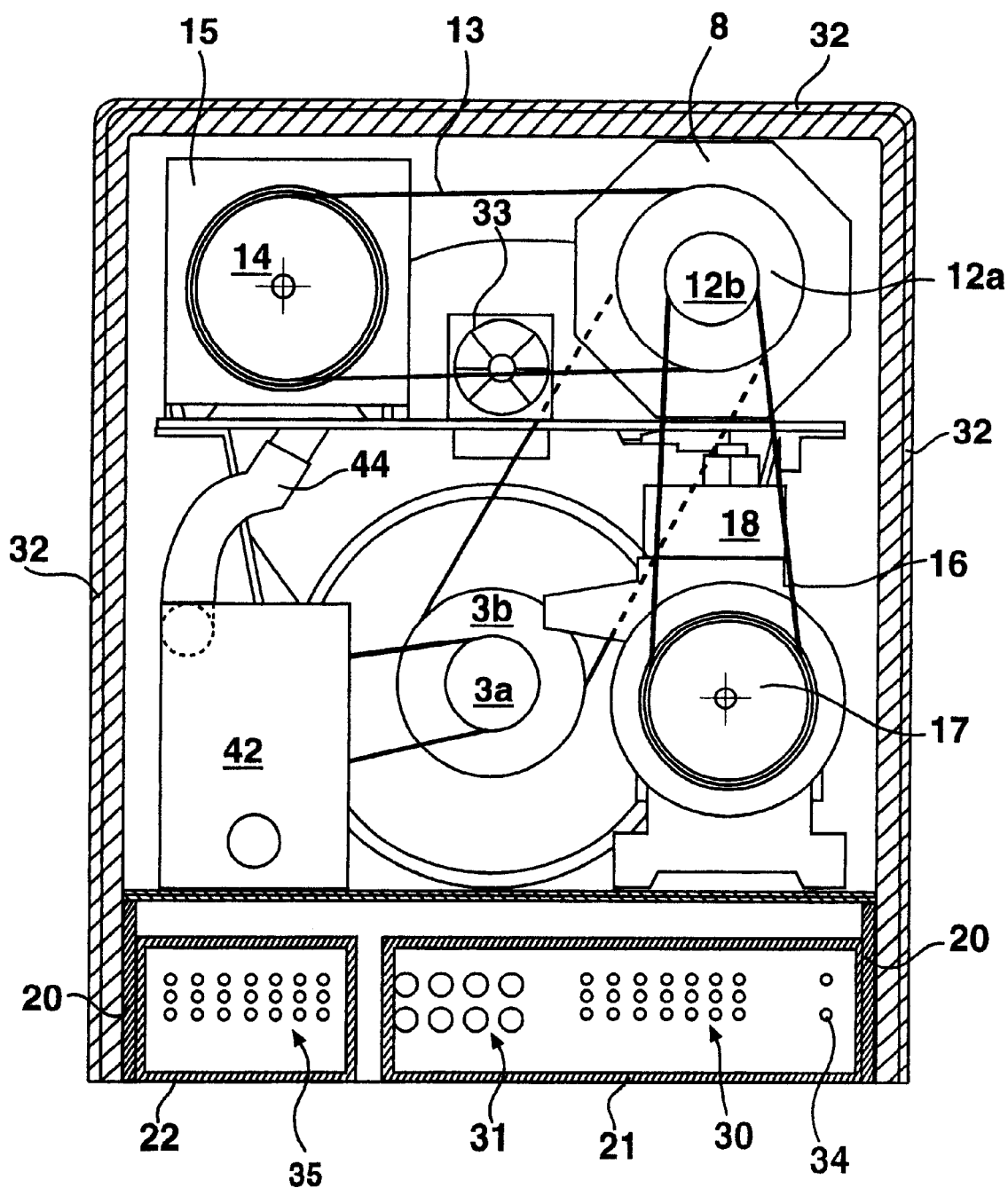
FIG. 5 shows a front view, partially in section. Of the operating unit of the preceding figures.
Figure 6:
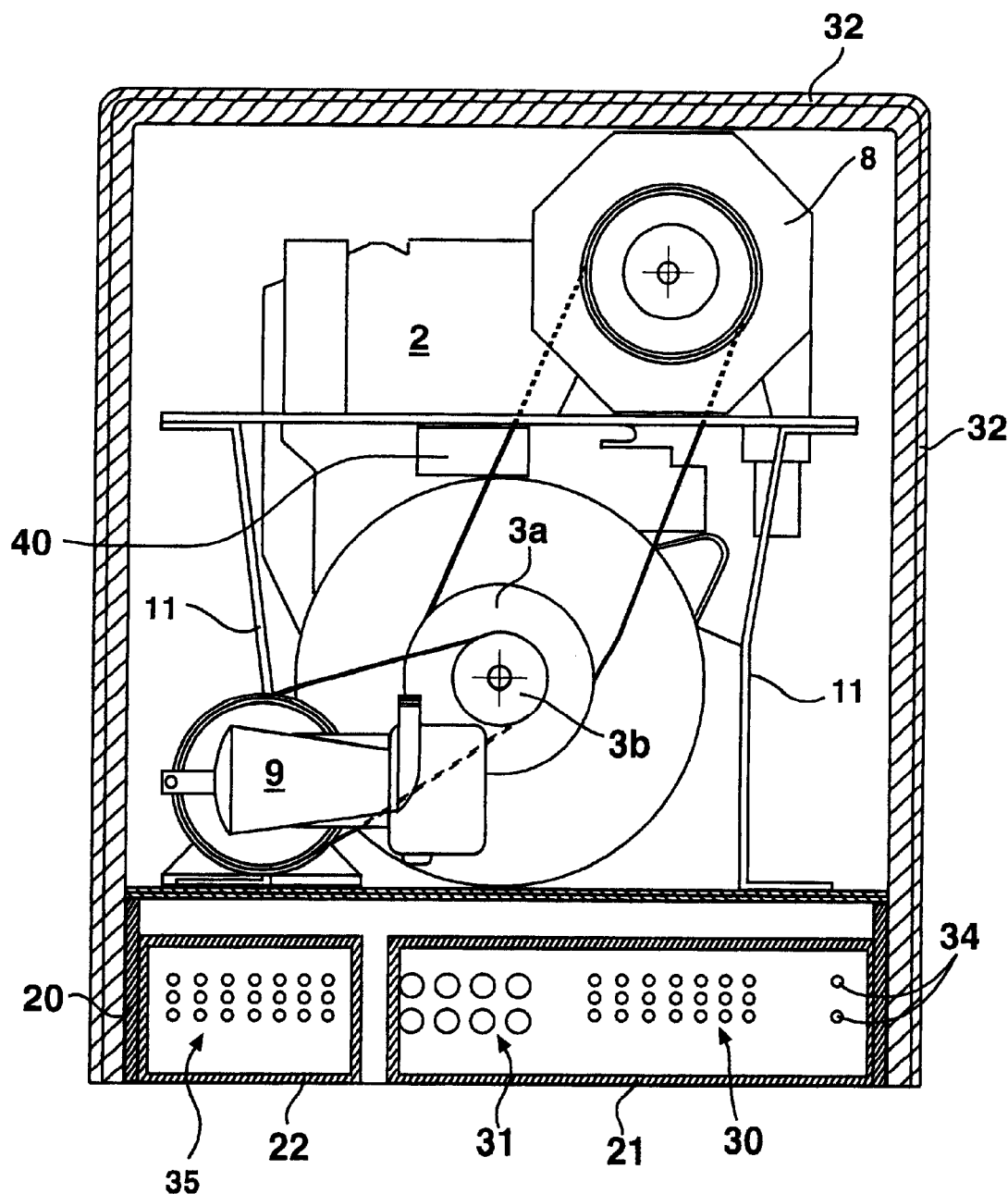
FIG. 6 is a view along the line VI—VI of FIG. 2.
Figure 7:
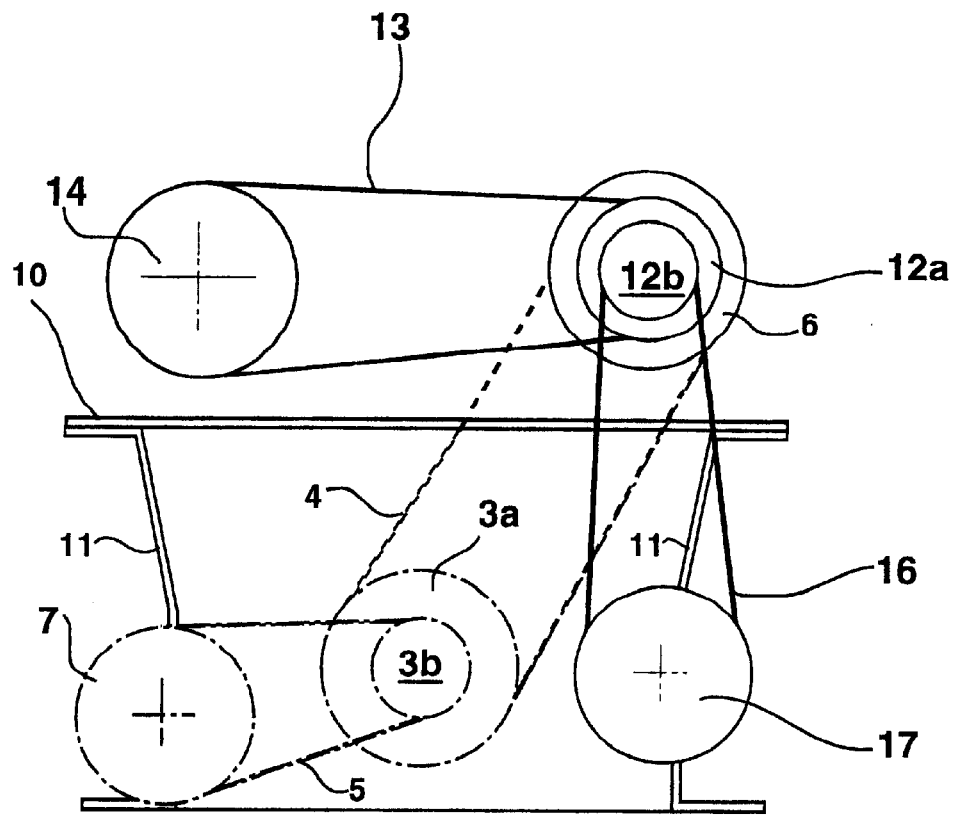
FIG. 7 is a diagram which illustrates the kinematic connection between some parts of the aforesaid operating unit.

The motor 8 has a double function, that of a transmission shaft and that of an actual motor, according to what will be explained more fully hereinafter; to this end its rotor is provided with a shaft which protrudes from both the axial ends of the motor (see FIGS. 2 and 4), on which there are mounted, respectively, the pulley 6 on one side, and a pulley 12 with two races 12*a*, 12*b* on the other. The first race 12*a*, which has the larger diameter, is connected by a belt 13 to another pulley 14 for setting in operation an alternator 15 which is also located on the bracket 10; the second race 12*b*, however, is coupled by way of a corresponding belt 16 to a pulley 17 which drives a compressor 18 placed below the motor 8, at the same level as the pump 9.

According to this embodiment of the invention, the pulleys 3, 6, 7, 12, 14 and 17 are all electromagnetic; this type of pulley, already known and commonly used in other fields (such as the automobile field), operates substantially as a friction clutch: when the electromagnet which is inside each pulley is not energized, the corresponding race rotates idly with respect to the shaft on which the pulley is mounted, so that the latter transmits no movement.

On the other hand, when current flows in the electromagnet, the pulley race is engaged with the shaft and therefore the transmission of the motion takes place as in conventional pulleys.

It can therefore be understood that in this way it becomes possible to control, according to requirements, the operation of the various components of the unit 1 which are connected by the belt transmissions.

It need only be added that in this embodiment of the invention the belts are preferably V-belts, but they could also be substituted by toothed belts or other flexible transmission systems (chains and the like); it should then be pointed out that the different superficial graphic representation of said belts, in the drawings has been used only to distinguish them more easily.

The unit 1 comprises a base 20 which supports the whole of its components described above; this base is hollow and inside it there are housed a first and a second container 21, 22.

The first of said container is a tank (of plastics, metal or other suitable material) which contains sea water fed by a pump 23 connected upstream to an intake 24 arranged on the hull S of a boat, by means of a first pipe section 25; along this pipe section there is preferably arranged a filter 26.

Figure 11:
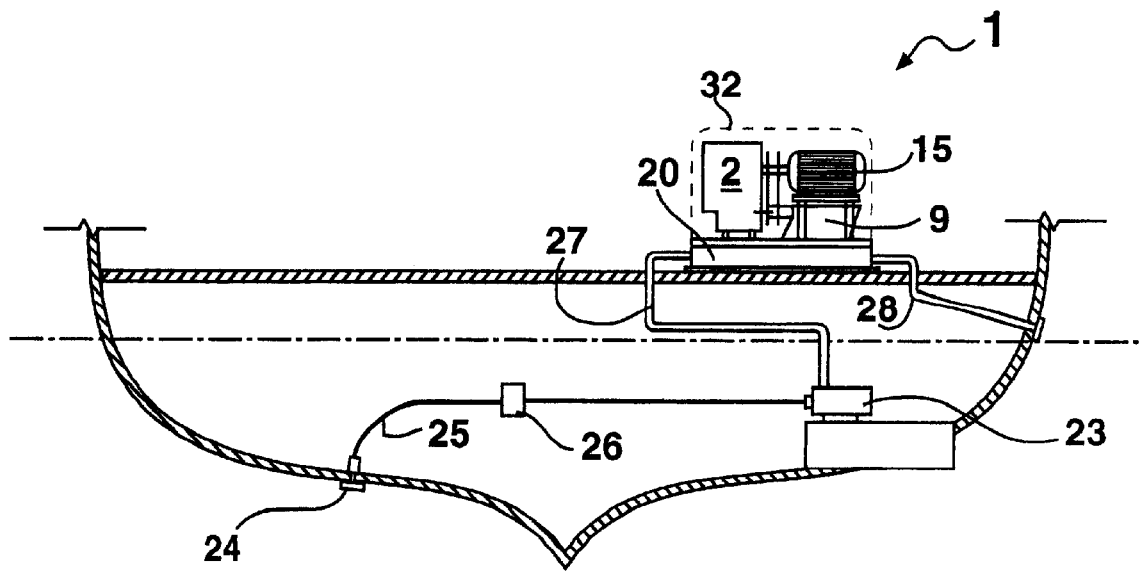
FIG. 11 illustrates diagrammatically the installation of the preceding operating unit aboard a boat.

The pump 23 causes the sea water to flow into a second pipe section 27, raising it to the operating unit I which in the example is located above the level of the sea (indicated by the dash-dotted line in FIG. 11).

It is clear, however, that the pump 23 could also be omitted in the case where the operating unit 1 were installed below the water line of the boat; by the same criterion, said pump could however be mounted on the base 20 like the other components of the unit 1, or in another position. The choice between these different solutions will be made depending on the boat on which the unit of the invention is to be used. For emptying the water from the first container 21 in this example a pipe 28 is provided which discharges overboard.

As can be seen from the drawings, inside the container 21 there is placed a coiled tube 30 which constitutes the condenser of an air-conditioning system of the boat for which the operating unit 1 is intended.

Moreover, in said container there is also arranged a tube nest 31 through which passes air coming from the surrounding space wherein the unit is located, which air is then circulated inside the sound-proofing casing 32 that encloses it, as commonly occurs in these units; the walls of this casing, which has substantially in the shape of a parallelepiped, are visible in section in the drawings.

The air cooled by passing in the tube nest 31, makes it advantageously possible to maintain the temperature in side the casing 32 at values below those of the surrounding air.

It should in fact be pointed out that the operating units considered here are usually installed in rather restricted rooms (machinery spaces and the like) in which the temperature may reach high levels when the diesel engine 2 and the alternator are in operation; consequently the possibility of cooling the air which circulates inside the casing 32 represents an important advantage obtained by the unit of the present invention.

For the internal ventilation of the casing, in this case a small fan 33 has been provided, placed between the electric motor 8 and the alternator 15 on the bracket 10. Finally, according to a preferred form of the invention, in the first container 21 there are also located the pipes 34 for supplying fuel to the internal combustion engine 2.

As can be seen from the drawings, the second container 22 is located beside the preceding one; differing therefrom, however, inside it ordinary water circulates (that is, not sea water) which is then conveyed to the fan-coils (not shown in the drawings) of the onboard air conditioning system.

To cool this water, inside the container 22 a coiled tube is provided which constitutes the evaporator 35 of the aforesaid conditioning system, while the water thus cooled is circulated by a pump 36 placed on the base 20 of the unit.

Figure 8:
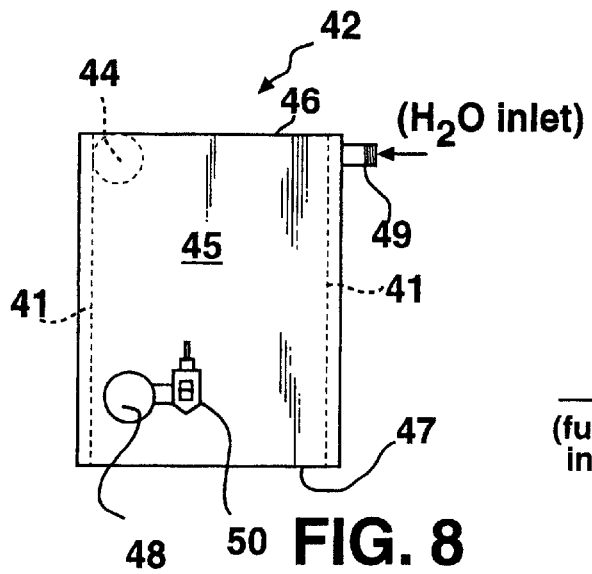
FIGS. 8, 9 and 10 show respective views of a detail of the unit of the preceding figures.
Figure 9:
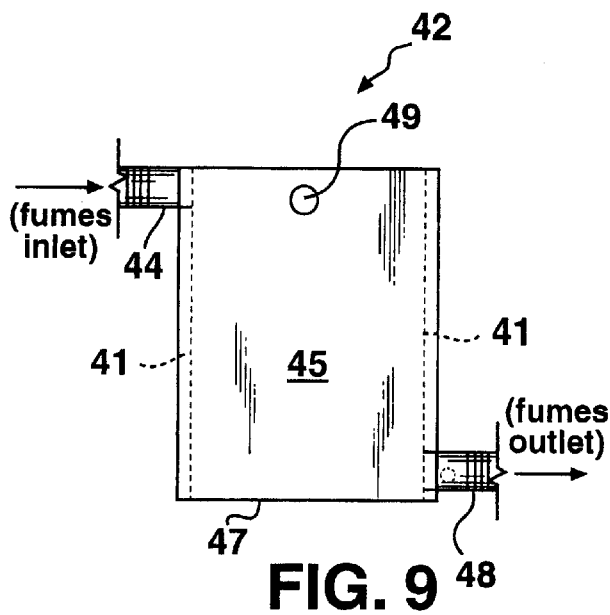
Figure 10:
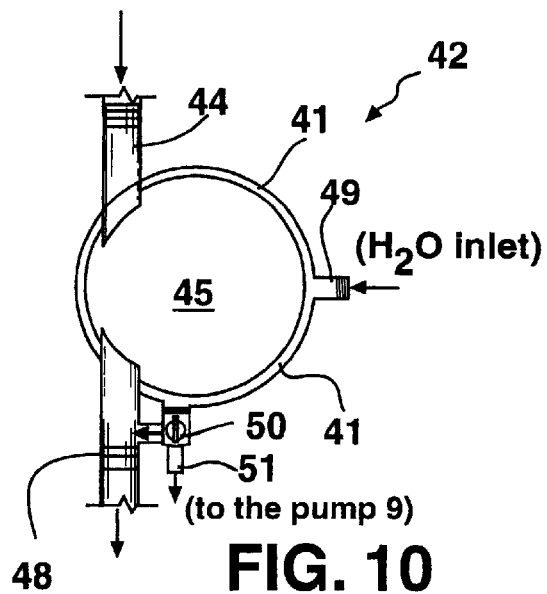

The engine 2 of the latter is provided with a pump 40 which draws (sea) water from the first container 21 and conveys it partly to the engine itself to cool it, as occurs in ordinary engines, and partly to a cooling jacket 41 a muffler 42 (FIGS. 8–10) which evacuates the fumes of the engine; to this end, the latter is connected to the muffler 42 by a manifold 44.

The aforesaid muffler is substantially a heat exchanger which makes it possible to heat the water to be desalinated, for reasons that will be explained more fully hereinafter.

It consists of a cylindrical chamber 45 bounded laterally by the jacket 41, closed at the top and bottom by respective ends 46 and 47; into the upper part of the cylindrical chamber there pass the fumes carried by the manifold 44, which are then evacuated from the lower part by way of an outlet pipe 48.

The sea water coming from the pump 40 enters the jacket 41 from an upper connection 49 and passes out through a three-way solenoid valve 50; more specifically, said valve causes the water to flow either towards the outlet 51 which is connected by way of a pipe (not shown in the drawings) to the pump 9 for desalination, or into the pipe 48 whence it is then discharged overboard together with the fumes of the engine 2.

The switching of the solenoid valve 50 for directing the water one way or the other will depend on the demand for water to be desalinated.

The operation of the operating unit 1 described so far may take place under two different conditions: the first occurs when the boat is underway, while the second occurs when the boat on which the unit is installed, is moored in port.

Starting with the first condition, during its course the internal combustion engine 2 is working while the electric motor 8 is disabled, that is to say, is not supplied with current and serves only as a transmission shaft. Indeed, the motor 8 does not supply any motive energy in this phase and it is the pulley 6, connected by means of the belt 4 to the first race 3a of the pulley 3, which sets in rotation its rotor and together with it the other pulley 12 located at the opposite end.

The belts 13 and 16 coupled to the races 12a, 12b of the pulley 12 allow the operation of the alternator 15 and of the compressor 18, with which they are respectively associated (by way of the pulleys 14 and 17).

At the same time, the belt 5 which joins the second race 3b of the pulley 3 mounted on the shaft of the internal combustion engine 2, makes it possible to operate the pump 9 for the desalination of the water.

Having regard more specifically to the various functions of the unit 1, it can be ascertained that in this working condition, that is, with the engine 2 in operation, the alternator 15 is always actuated: this means that in this condition the electromagnetic pulleys 3, 6, 12 and 14 are engaged, so as to allow the rotation of the alternator 15 and therefore to obtain the production of electric power for on board use.

With regard to the compressor 18, however, if air conditioning is not required, it can be disconnected; consequently in a similar context the magnetic pulley 17 which receives the motion (by way of the belt 16) from the pulley 12, is kept idle on the shaft of the compressor by deactivating its electromagnet.

On the other hand, when air conditioning of the boat is required, the pulley 17 is engaged, so that the compressor 18 can compress the refrigerating fluid of the system and convey it to the condenser 30 downstream of it, inside the first container 21. From there, the refrigerating fluid passes to the evaporator 35 located in the other container 22, where it cools the water contained therein which is then circulated into the various fan coils of the air conditioning system, by the pump 36.

With regard to the desalination of the water, however, if this function is not required the electromagnetic pulley 7 associated with the pump 9 conveying water to the osmotic membranes (not shown), is deactivated; in this way said pump is disconnected from the pulley 3 driven by the diesel engine 2.

At the same time, since the pump 40 of the engine 2 nonetheless conveys water taken from the first container 21 to the jacket 41 of the muffler 42, the solenoid valve 50 is switched so as to allow the water to flow into the outlet pipe 48, whence it is discharged together with the fumes of the engine 2.

On the other hand, if water is required to be desalinated, the pulley 7 is engaged to connect the pump 9 to the drive pulley 3; the valve 50 in this phase is switched so as to cause the water circulating in the jacket 41 to flow towards the outlet 51, whence it then passes to the pump 9.

It is important to emphasize that with this solution the water to be desalinated is heated before being conveyed to the osmotic membranes by the pump 9; in this manner an improved output is obtained from the in board desalination system.

These membranes in fact have a desalination capacity which is maximum for water temperatures of about 25° C. And decreases as the temperature falls; consequently, it is not difficult to understand that the heating of the water as a result of the thermal exchange with the exhaust gases in the muffler 42 facilitates its desalination by osmosis in the aforesaid membranes, to full advantage of the output of the latter.

It should also be pointed out that the muffler designed in this way makes it possible to attenuate the vibrations produced by it, therefore reducing the noise.

As stated above, the second operating condition taken into consideration for the operating unit 1 is that which occurs when the boat is moored in port or, in other words, when electric power and drinking water are available from the mains supply of the dock where the boat is moored.

In this situation, the internal combustion engine 2 is switched off because there is no need to produce electric power, since this is already supplied from outside; assuming also that desalination is no longer necessary either, because of the availability of drinking water, the operating unit 1 can be used for air conditioning.

For this purpose it is therefore necessary to operate the compressor 18; to this end, the electric motor 8 in this phase is with the electric current supplied from the dock, effecting by way of the belt 16 and the pulleys 12, 17, the operation of the compressor 18.

The circulation of the refrigerating fluid in the condenser 30 which is in the first container 21, and in the evaporator 35 located in the second container 22, takes place as already explained before; the same applies to the water which is conveyed from the latter container by the pump 36 to the fan-coils of the air conditioning system.

It should be noted, however, that although in this operating phase the diesel engine 2 is switched off and no water for desalination is taken from the first container 21, it is nevertheless expedient that inside the latter a circulation of sea water be maintained which is then discharged overboard by the pipe 28 connected to the container 21.

Indeed, this makes it possible to have a change of water for dispersing the heat exchanged with the condenser 30 housed inside the first container and for controlling the temperature of the water contained therein, thus ensuring the maintenance of the conditions required for the optimum operation of the air conditioning system.

It can be understood that if there were no such change, the temperature of the water in the container 21 would raise, causing a consequent reduction in the thermal exchange with the condenser 30 and a deterioration in the cooling efficiency of the air conditioning system.

From what has been explained heretofore, it is possible to appreciate how the operating unit 1 according to the invention fulfils the object set initially.

Indeed, the presence of the first container 21 into which sea water is caused to flow, makes it possible to obtain some important advantageous effects, either with regard to the operating unit itself and with regard to the utilization of the energy on board the boat wherein it is installed.

Firstly it should be noted that in this way it is possible to arrange for the mechanical actuation of the compressor 18 and of the pump 9 by connecting them directly to the internal combustion engine 2 through fairly simple transmission means, thereby eliminating the respective electric motors which are used instead in common pleasure boats.

In other words, owing to the location near the diesel engine 2 of the container 21 in which the sea water circulates, it is possible to use such container both as a water heat exchanger for cooling the condenser 30, either as a tank from which water to be desalinated may be taken; the compressor 18 and the pump 9 can therefore be arranged near the engine 2 and driven by the mechanical power delivered by the latter, instead of by respective electric motors.

In this context it is important to consider that the known desalinating and air conditioning units currently installed on pleasure boats are independent separate apparatuses, each of which comprises its own electric motor to drive, respectively, the pump conveying the water to the osmotic membranes, and the compressor.

Both these electric motors are supplied by the in board main which is fed with electric power generated by the alternator.

Consequently it is not difficult to understand that in these known applications the mechanical energy produced by the diesel engine is first transformed into electrical energy by the alternator and then converted back into mechanical energy by the above-mentioned electric motors to compress the refrigerating fluid (in the case of the compressor) or pump the water to the osmotic membranes.

The inevitable losses which occur during all these transformations render the utilization of the energy produced by the diesel engine, certainly not optimum.

In the unit of the present invention, on the other hand, the pump 9 and the compressor 18 are driven directly by the mechanical energy produced by the internal combustion engine 2 so that the overall efficiency of the system (considered as the ratio between the energy actually supplied to the pump and to the compressor, and that available at the output at the engine 2) is significantly improved.

In this context it should also be noted that the presence of the various belt transmission makes it possible to obtain a transmission ratio which assists designers in the choice of diesel engine to be used.

It should in fact be borne in mind that in the known electric power generators, the alternator is customarily mounted rigidly (with flange joints or the like) on the shaft of the engine; consequently, in order to have an alternating current with a frequency of 50 Hz at the alternator, it is necessary for the engine to have a corresponding rotational speed (usually 1500 or 3000 rpm., depending on the number of poles of the alternator).

This limits the choice of engines to those which have an operating curve adapted to these rotational speeds.

With the series of mechanical transmissions provided in the unit of the present invention, however, it becomes possible to create transmission ratios between the various components which allow optimum adaptation of the operating regime of the engine, to the number of revolutions required for the alternator.

In this way it is thus possible to select the most suitable engines for each the circumstance (with regard to power to be delivered, torque available, etc.), without particular limitations owing to the number of revolutions of the alternator.

To all that it should also be added that with the operating unit of the present invention it is possible to eliminate the lifting pumps which are customarily employed in the known air conditioning and desalinatoring units.

As stated before, these units in the know boats are each an independent, separate apparatus; for each of them a respective pump is therefore used which serves to convey the sea water to the heat exchanger used for cooling the condenser of the air conditioning system, or to the high pressure pump (also called "booster") for the osmotic membranes. It goes without saying that all these pumps require as many pipes and services for their functioning.

In the operating unit of the present invention, on the contrary, a single pump 23 is sufficient for feeding the sea water into the container 21, which is in practice a storage chamber that serves both for cooling the condenser 30 and for supplying the pump 40 of the engine 2, which in turn supplies the desalination pump (pump 9).

As can be seen, the container 21 thus makes it possible also to obtain a significant simplification of all the equipment necessary in the known applications.

It is not difficult to understand that in this way also the space occupied by all this equipment is eliminated; in other words, it can be stated that with the unit of the invention it is possible to obtain a reduction in the space occupied by the various air conditioning and desalination apparatuses (but not only those, as will be seen more fully hereinafter), which as stated before are at present independent, separate apparatuses, with all that entails.

In this context there it also be mentioned another important advantageous effect obtained by the use of a container filled with sea water, which serves for the cooling of the internal combustion engine as in the case of the example described above.

A concrete problem arising for pleasure boats is that of the temporary blocking up, for example caused by a plastic bag or some floating body, of the sea intake for the entry of the water intended for cooling the diesel engine.

If the inflow of water is not resumed within a short time, there is a risk of the occurrence of an overheating of the engine, which may lead to the breakdown or to the damaging thereof.

In the operating unit 1 of the present invention, the container 21 constitutes, as stated before, a storage chamber for the water which in the case of blocking up of the sea intake, makes it possible to have a certain margin of time before the engine overheats too much and/or its pump burns out; consequently it is possible to provide safety systems (thermal switches for shutting off the engine or the like) which intervene effectively when the level of the water in the container falls below a predetermined level.

It is therefore worth remembering that in the operating unit according to the invention there is also an effective system of ventilation of the outer casing 32, owing to the cooling of the air which is circulated within the latter, by passing through the tubes 31 immersed in the container 21.

It will be understood that this solution contributes to improved functioning of the diesel engine 2, together with that of cooling, with the same principle the fuel which passes through the tubes 34.

Lastly, it should also be pointed out that the operating unit 1 has an overall size substantially equal to that of a conventional generator of equivalent power.

Indeed, the length of the known generators is determined by the sum of that of the diesel engine and of the alternator connected thereto, while the width usually depends on the engine's.

As can be seen from the drawings, the unit of the preceding example comes substantially within these overall dimensions.

This is achieved also owing to the possibility of using the electric motor 8 as a simple transmission shaft during a working phase of the unit.

Also the presence of the containers 21 and 22 incorporated in the base 20 of the unit 1 represents a rational solution for the use of space which does not cause substantial increases in the overall size of the unit.

In general, it may be stated in conclusion that owing to the use of the container wherein sea water circulates, the present invention makes it possible to produce operating units for the nautical field which are capable of performing various functions other than that of generating electric power, giving rise to a more rational and advantageous use of in board resources (space, energy available, etc.).

It is therefore obvious that on the basis of this teaching it is possible to design numerous variants of the unit described in the preceding example.

Firstly it should be stated that the simultaneous presence of the compressor 18 for the air conditioning system and of the pump 9 for the desalinator is not strictly necessary; consequently it is possible to have operating units wherein only one of these is present; this will depend each time on the equipment required for each boat.

It should also be pointed out that the pump 9 could take the water directly from the first container instead of being fed with water conveyed by the pump 40 and heated in the muffler 42; such a solution would obviously not obtain the same advantages of the desalination of the water at the best temperature for the osmotic membranes, but should not however be discarded a priori.

Similarly, the second container 22 for the water intended to circulate in the fan coils of the air conditioning system, might also be eliminated; for example, an air conditioning system might be designed in which the evaporator 35 is placed at a distance from the operating unit and is associated with a fan (for example in a battery provided with fins), so as to deliver cool air directly into the surrounding atmosphere or into a manifold pipe which carries the air to the outlets positioned along the boat.

In the same way, the operating unit I of the example described above could be integrated with further functions.

One of these consist in also cooling the alternator with water taken from the first container; in the prior art there are already generating units wherein the alternator is cooled with water which serves also for cooling the engine. However, since this water becomes hot after being passed through the engine, it is cooled by an intermediate radiator placed in the circuit between the engine and the alternator.

In the case of the unit according to the invention, however, the water contained in the first container is water taken from the sea and is therefore at the optimum temperature for cooling the alternator.

It just matters to state that the pump necessary for feeding the cooling water to the alternator could be arranged on the base 20 (or on the bracket 10) of the unit 1 and driven by the engine 2 by a belt transmission, likewise what has already been described for the other components of the unit.

To this end it should be pointed out that the pump 23, which in the drawings has been shown in a remote position, may instead also be incorporated in the unit 1 and also be actuated by the diesel engine 2 by way of a respective transmission system.

Finally, it should be added that also the number and shape of the containers into which the sea water is fed may differ from what has been described with reference to the preceding example.

It will in fact be understood that the quantity of water necessary for the functioning of the operating unit will depend principally on the number of functions which the latter performs (that is, whether desalination and/or air conditioning and/or cooling of the alternator and/or others, are required) and on the power of the unit itself (i.e. the kW produced by the alternator).

Depending thereon, it is therefore possible to have units with containers of greater or smaller capacity or units with more than one container, supplied with sea water. Moreover, the shape and position of these containers may also differ from case to case: consequently it is possible to have containers of cylindrical or similar shape, also arranged outside the base of the unit.

Figure 12:
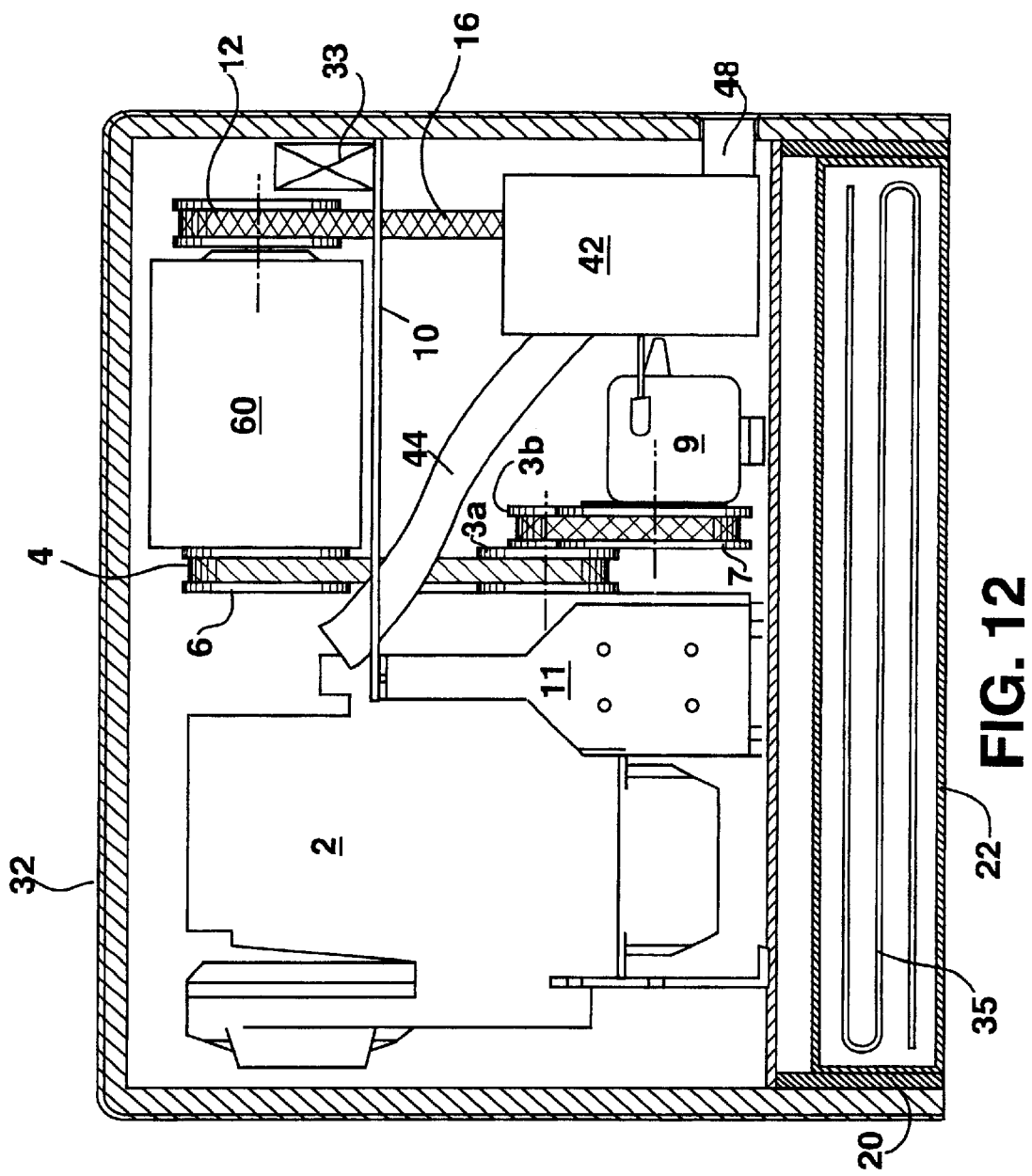
FIGS. 12, 13 and 14 show respectively a side view, a top view and a front view of a second embodiment of an operating unit according to the invention.
Figure 13:
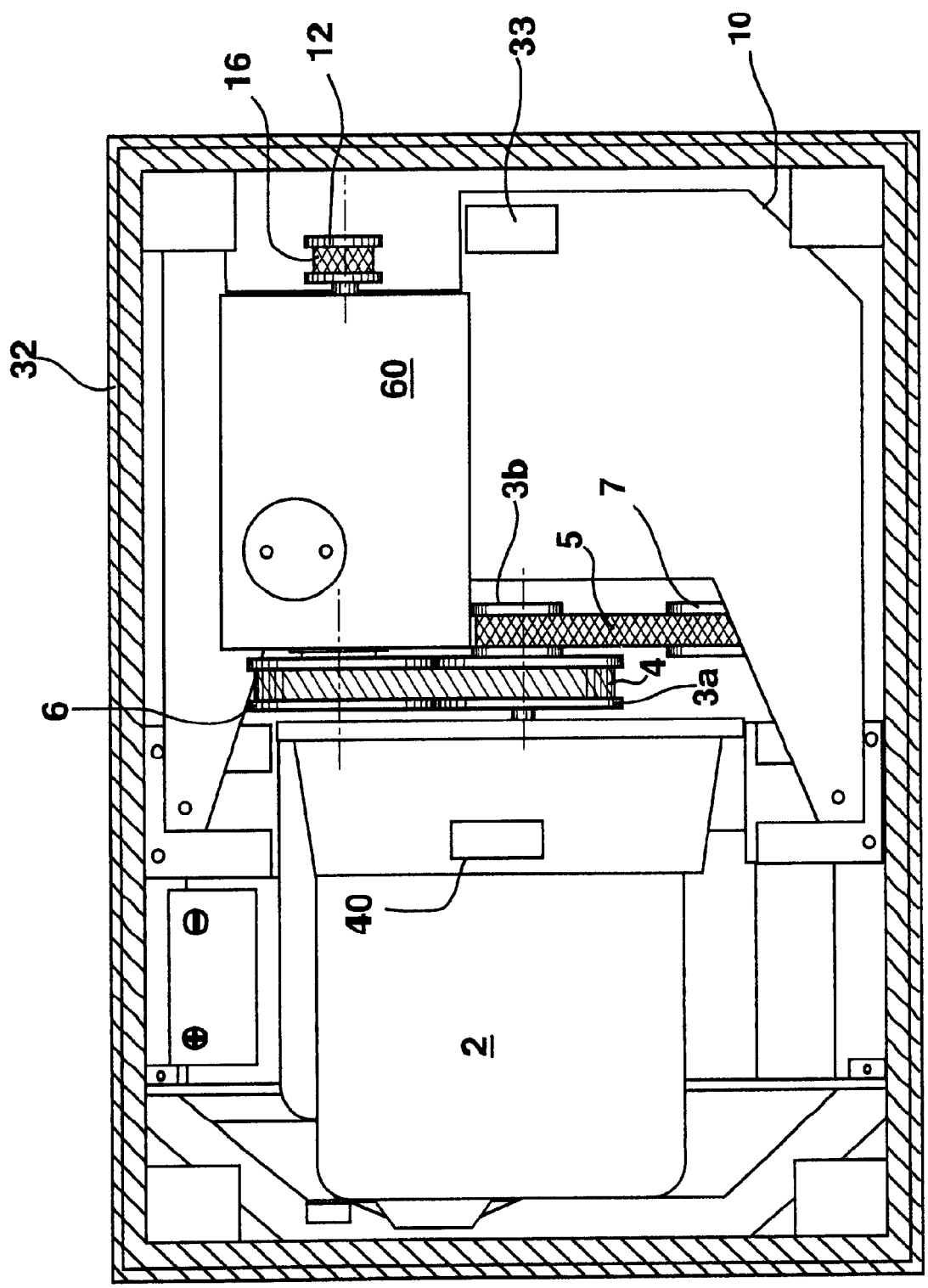
Figure 14:
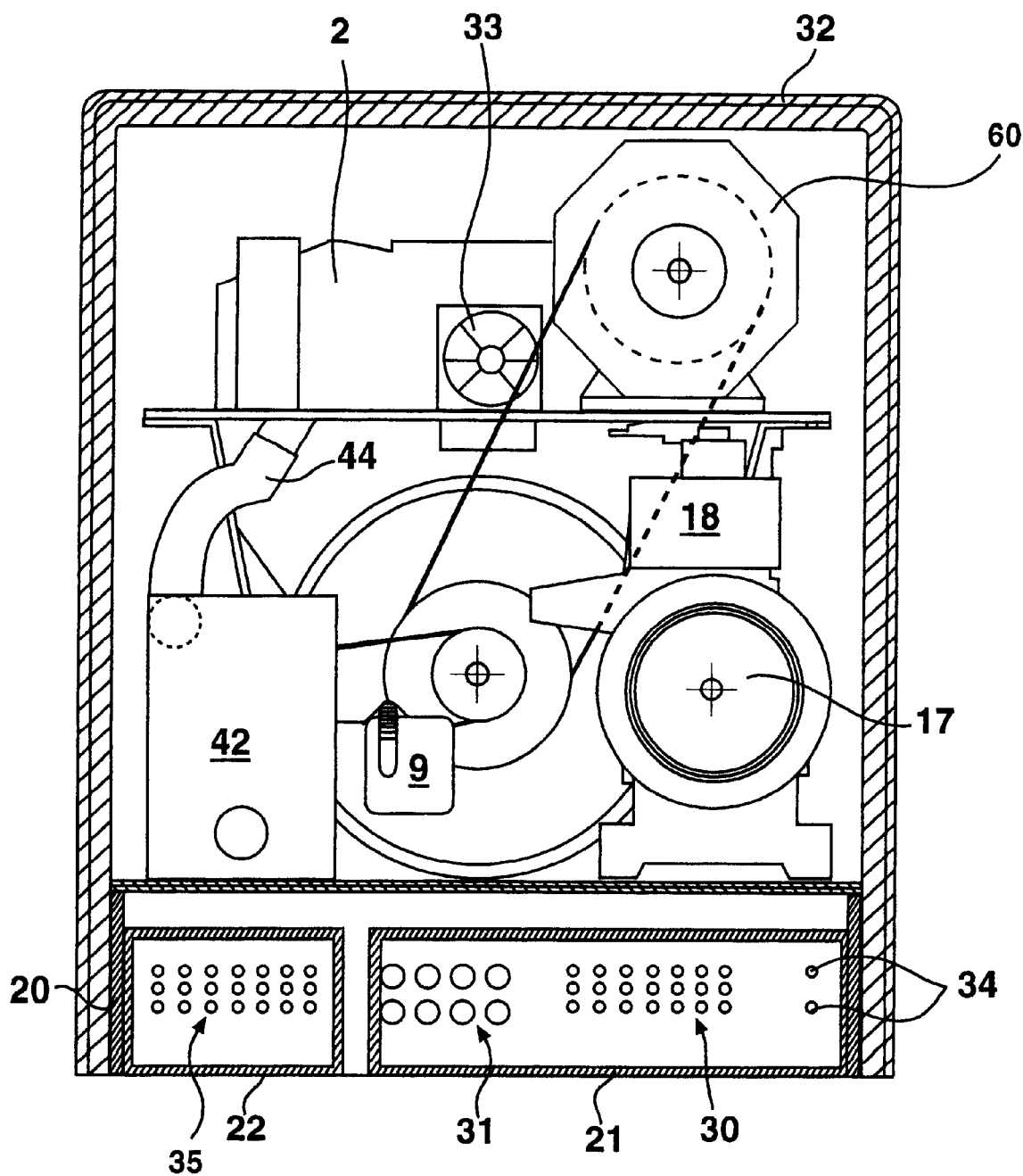

Lastly, a further possible variant to be considered is that constituted by an operating unit wherein the alternator 15 and the electric motor 8 (which in the example described are two separate elements) are incorporated in a single electrical machine. This variant is illustrated in FIGS. 12–14, where the elements equal to those already considered above have been indicated with the same reference numbers, and for their description reference should be made to what has already been stated.

More specifically, the electrical machine 60 has in this case a double function which, in the operating phase of the unit 1 wherein the diesel engine 2 is switched on, makes it possible to generate electric power as an alternator, whereas in the phase in which said engine is switched off and the unit is connected to the mains electric system of the dock, it becomes an electric motor.

Obviously the electrical machine 60 is provided with the necessary control systems, known per se, for switching its operation from alternator to electric motor and vice versa; moreover, the shaft on which the rotor of the machine 60 is mounted extends axially, protruding at the opposed ends of the latter (as seen previously for the electric motor 8), so as to permit the application of the pulleys 6 and 12.

Consequently, when the engine 2 is running, the race 3a of the pulley 3 with two diameters puts the pulley 6 in rotation by means of the belt 4; at the same time, the second race 3a of the pulley 3 moves the pulley 7 associated with the pump 9, by means of the belt 5.

The motion of the pulley 6 is therefore transmitted both to the internal rotor of the machine 60 which operates as an alternator, and to the other pulley 12: the latter then operates the compressor 18 in turn, by way of the belt 16 and the pulley 17.

Naturally, if the pulleys 7 and 17 are not engaged, that is if their electromagnet is not energized, the pump 9 and the compressor 18 can be excluded while it is nonetheless possible to produce electric power by causing the machine 60 to rotate as an alternator.

When, however, the unit 1 is supplied with electric current from outside, as it happens when the boat is moored in the dock, the machine 60 is switched to function as an electric motor and can drive the compressor 18 if required.

It is only necessary to state that the variant just considered can be produced both in the case of electrical machines which operate (on) and generate alternating current, and in the case of machines which operate (on) and generate direct current; it will in fact only be a question of having an electrical system with current rectifying means if necessary.

To conclude, it needs only be added that numerous other possible variants can be obtained with systems for transmitting the motion which differ from those described here; mention has already been made of the possibility of using flexible means other than belts, but neither can the possibility of using gear transmissions or other types of transmissions be excluded.

These and further possible variants, however, fall within the scope of the following claims.

What is claim is:

1. An operating unit for a boat comprising:

an internal combustion engine;

an electrical machine actuated by said engine for generating electric power for use one board;

at least one container associated with the engine and in fluid communication with water outside of the boat where the unit is installed and in which the boat is floating, the water circulating inside the container; and a pump actuated by the internal combustion engine, for supplying water from said at least one container, to osmotic desalination membranes.

2. A unit according to claim 1, wherein the engine is cooled with water taken from said at least one container.

3. A unit according to claim 1, wherein in said at least one container there is housed a condenser of an air conditioning system for the boat where the unit is installed.

4. A unit according to claim 3, wherein said air conditioning system comprises a compressor actuated by the internal combustion engine.

5. A unit according to claim 1, wherein the water which reaches the pump for supplying the desalination membranes, is heated by fumes of the internal combustion engine at a muffler provided with an external jacket in which the water circulates.

6. A unit according to claim 1, wherein said at least one container is traversed by at least one pipe for passage of at least one of: (i) air coming from outside, (ii) air circulating inside a soundproofing casing of the unit and (iii) air being sucked by the internal combustion engine.

7. A unit according to claim 6, wherein in said at least one container pipe is arranged for supplying fuel to the internal combustion engine.

8. A unit according to claim 1, wherein the internal combustion engine and the electrical machine actuated by it are arranged on a base in which said at least one container is housed.

9. A unit according to claim 3, further comprising a further container that contains water for thermal exchange elements of the air conditioning system, the further container being housed in a base of the unit and in which an evaporator of said system is arranged.

10. A unit according to claim 1, further comprising an electric motor whose rotor is kinematically connected to the internal combustion engine and to the electrical machine so as to set the latter in rotation using one of mechanical energy supplied by the internal combustion engine and electric power supplied by an onshore mains system when the boat where the unit is installed, is moored.

11. A unit according to claim 10, wherein the internal combustion engine drives a pulley connected by way of a belt to a first pulley mounted at one end of an axial rotating shaft of the electric motor, which bears at the opposite end a second pulley connected by way of a further belt to the electrical machine.

12. A unit accordance to claim 11, wherein the pulley driven by the internal combustion engine is a double diameter pulley and one of its races is connected by way of a belt to a drive pulley of the pump which supplies water for desalination to the osmotic membranes.

13. A unit according to claim 12, wherein the second pulley of the electric motor is a double diameter pulley and one of its races is connected by way of a belt to a drive pulley or a compressor of an air conditioning system of the boat where the unit is installed.

14. A unit according to claim 13, wherein at least one of the pulleys is associated with at least one of the internal combustion engine, the electric motor, the pump and the compressor, and the at least one pulley is an electromagnetic friction pulley.

15. A unit according to claim 10, wherein the machine for generating electric power and the electric motor are incorporated in a single machine adapted to function both as a generator and as a motor, and is kinematically connected to the internal combustion engine and to a compressor of an air conditioning system, for its operation, driven using one of mechanical power supplied by the internal combustion engine and electric power supplied by an onshore mains system when the boat where the unit is installed, is moored.

16. A unit according to claim 1, wherein the machine for generating electric power is cooled with water coming from said at least one container.

17. A unit according to claim 1, wherein said machine for generating electric power generates electric power as alternating current.

* * * * *